Oct. 24, 1967 M. J. H. STAAR 3,349,192

TAPE SENSER FOR DICTATING MACHINES

Filed Oct. 3, 1962 3 Sheets-Sheet 1

INVENTOR.
MARCEL JULES HELENE STAAR
BY Wolfe, Hubbard, Voit & Osann
ATTYS.

Oct. 24, 1967 M. J. H. STAAR 3,349,192

TAPE SENSER FOR DICTATING MACHINES

Filed Oct. 3, 1962

3 Sheets-Sheet 2

INVENTOR.
MARCEL JULES HELENE STAAR
BY Wolfe, Hubbard, Voit & Osann
ATTYS.

INVENTOR.
MARCEL JULES HELENE STAAR
BY Wolfe, Hubbard, Voit & Osann ATTYS.

United States Patent Office 3,349,192

Patented Oct. 24, 1967

3,349,192

TAPE SENSER FOR DICTATING MACHINES

Marcel Jules Helene Staar, Brussels, Belgium, assignor to Usines Gustave Staar, S.A., Brussels, Belgium, a corporation of Belgium Filed Oct. 3, 1962, Ser. No. 228,041
3 Claims. (Cl. 179—100.2)

This invention relates to apparatus for sound recording and playback and in particular to controls for such apparatus of the type particularly adapted for use as office dictating machines.

While the invention will find advantageous application in a variety of such dictating machines, it is especially useful on dictating machines of the type using a relatively wide band of magnetic tape for the recording medium wherein the recording is in the form of longitudinally spaced transverse traces across the tape produced while the tape is intermittently advanced, and wherein the tape is severed to separate descrete lengths of tape with dictation for transcription purposes, leaving an end threaded into the drive mechanism. Such dictating machines heretofore have presented difficulties and inconvenience in the backspacing operation during both recording and transcription, in that it has been possible for the operator to accidentally backspace the tape completely out of threaded engagement with the tape drive mechanism.

The general aim of the invention is to preclude backspacing the tape free of the drive mechanism thereby to make it possible for the operator to backspace the tape at high speed in locating dictation on any portion of the tape to facilitate convenient and efficient dictating machine operation.

It is an additional object of the invention to provide an improved system to cause the backspacing operation to automatically stop before the end of the tape is moved free of the tape drive mechanism.

Another object is to provide a simple system which senses the tape position and accurately interrupts the backspacing drive when the tape has been returned to a position in which the first recording trace is situated at or slightly upstream of the recording head.

Other objects will be apparent from the following description taken in connection with the accompanying drawings, wherein.

While the invention has been shown and is described in some detail with reference to particular embodiments thereof, there is no intention that it thus be limited to such detail. On the contrary, it is intended here to cover all modifications, all alternative constructions and equivalents falling within the spirit and scope of the invention as defined by the appended claims.

Figure 1:
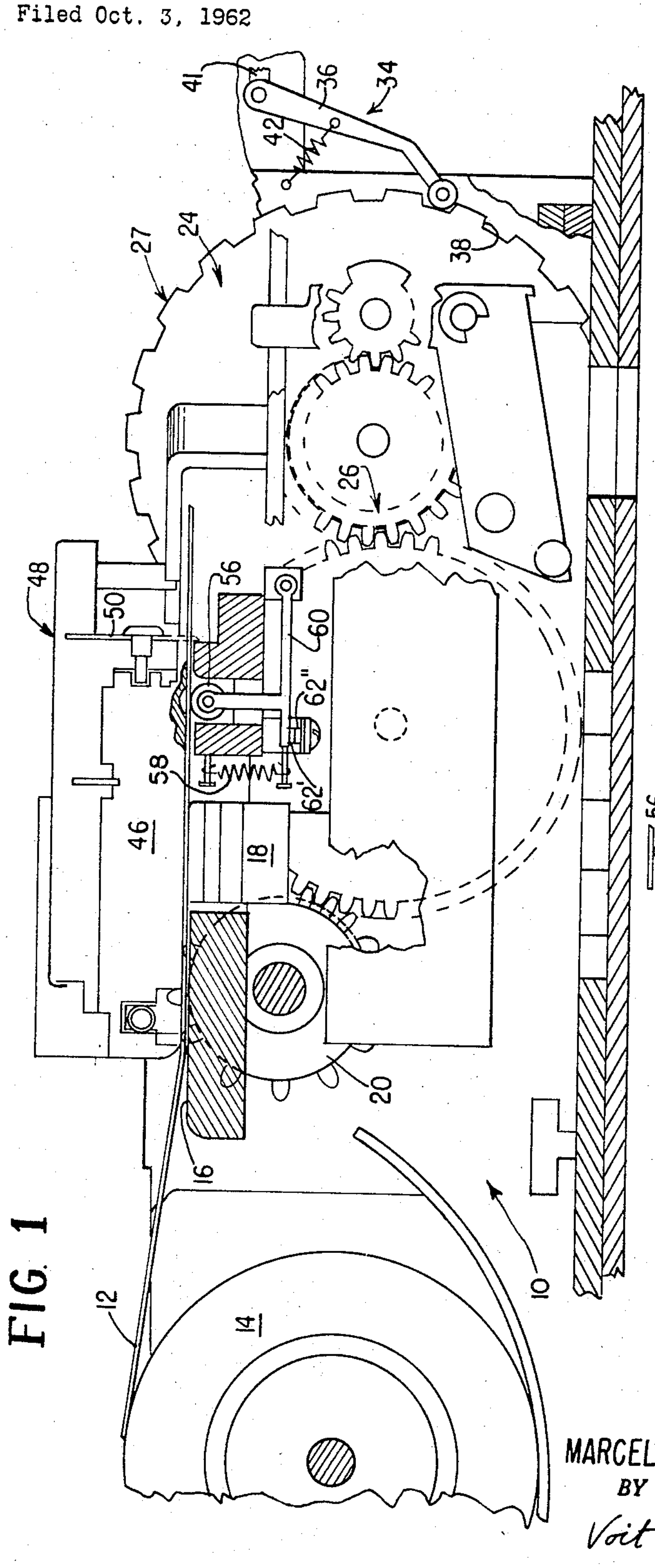
FIGURE 1 is a longitudinal fragmentary sectional view taken through an illustrative dictating machine.

Referring now to FIG. 1, an exemplary dictating machine 10 selected to make clear the environment of the invention is there illustrated as a machine for recording on a wide band of magnetic tape 12. The tape is stored in the machine on a supply roll 14, and is unwound from the roll during the recording process and intermittently fed forwardly along a flat horizontal supporting surface 16 over a recording and playback head 18 which is oscillated transversely of the tape in synchronism with the forward stepping of the tape. The tape 12 is driven by sprockets 20 engaged in rows of openings 22 along the margins of the tape and operated from a stepping motor 24 through a gear train 26.

It is preferred to employ a stepping motor 24 which is reversible for both advancing and backspacing the tape 12 at the direction of the operator to position different sections of the tape over the recording and playback head. It is possible thereby for the operator of the machine when it is being used for recording dictation to backspace the tape to locate previously recorded dictation over the recording and playback head for playback. Where the machine is being used for transcription it likewise is possible to locate the tape quickly and conveniently at any position for playback. A suitable stepping motor and drive is described in detail in copending application of Marcel Jules Helene Staar, Ser. No. 181,544, filed Mar. 22, 1962 entitled "Stepping Motor Device," now U.S. Patent No. 3,254,245.

Figure 1A:
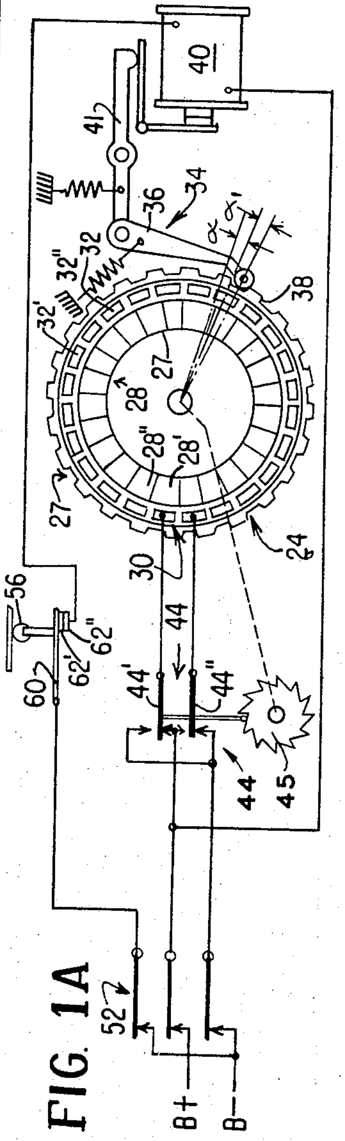
FIG. 1A shows a diagrammatic representation of the stepping motor for the tape drive and the electrical control circuit therefor.
Figure 2:
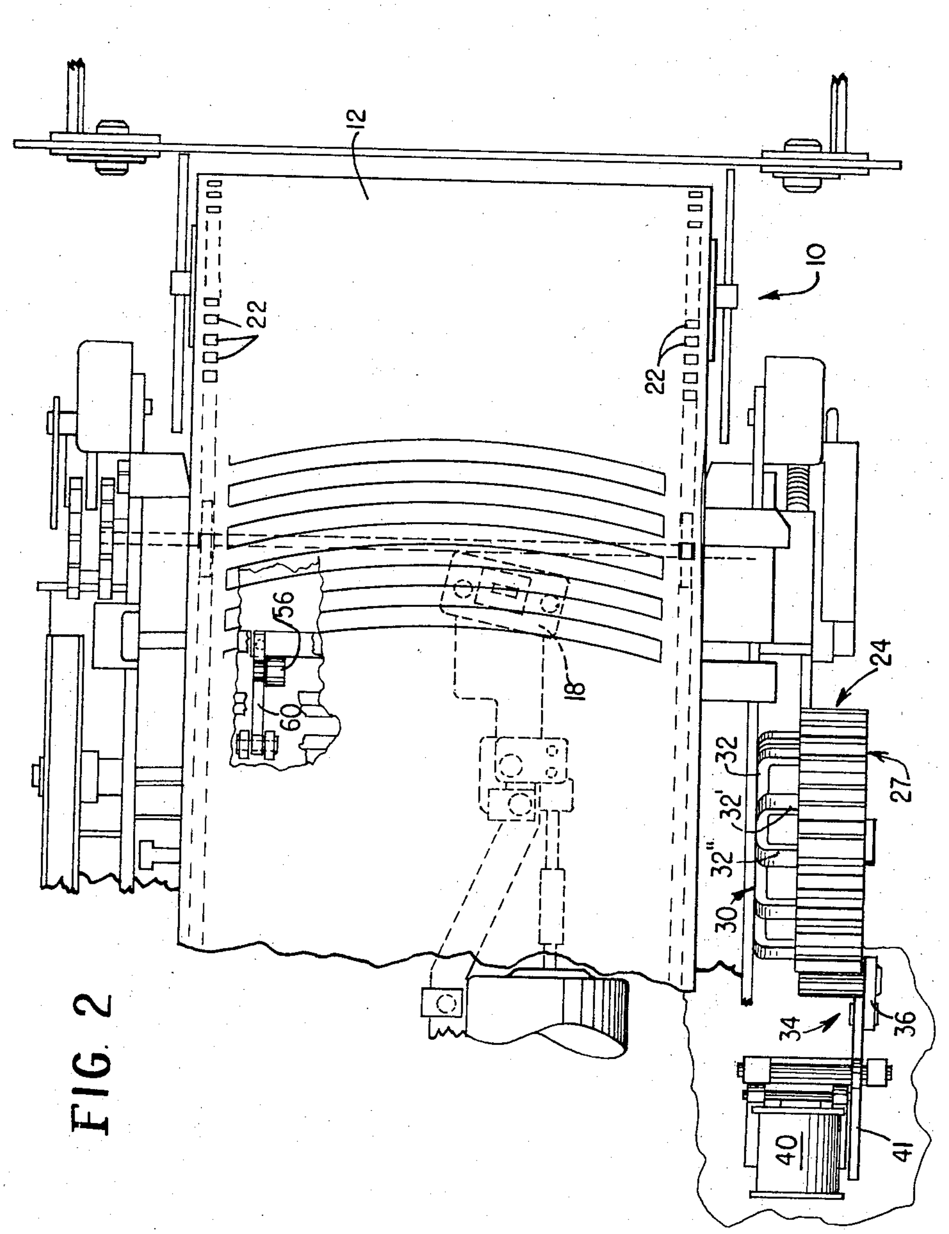
FIG. 2 is a fragmentary plan view of the dictating machine shown in FIG. 1 with the knife bar and other portions of the housing removed.

For present purposes the stepping motor 24 is shown diagrammatically in FIG. 1A having a rotor 27 with permanent magnet segments 28, with alternate segments 28′, 28″ having opposite polarity. The stepping motor also has a stator 30 having a ring of stator poles 32 around the rotor, with the stator poles being energized from a suitable source of potential, hereinshown as B+, B−, such that alternate stator poles 32′, 32″ have opposite polarity. The polarity of the stator poles 32 is reversed as an incident to each step of the rotor 27, so that the rotor undergoes successive impulses in the direction determined by a mechanical preference means 34 which offsets the rotor in the desired direction of rotation by a small angle $\alpha$ or $\alpha_1$, from the position of equilibrium of the rotor poles relative to the stator poles.

A reversible preference means is diagrammatically shown in FIGS. 1 and 1A as including an element 36 engaged at its end portion in grooves 38 in the rotor periphery. A reverse solenoid 40 is connected to such element 36 by a lever 41 so that with the solenoid 40 energized such element is pivoted counterclockwise tending to urge the rotor 27 in a clockwise direction by a slight angle $\alpha_1$, which in the present case is the reverse direction. With the reverse solenoid 40 deenergized, springs 42 connected to the element 36 and lever 41 pivot the element clockwise, tending to prefer the rotor counterclockwise by the angle $\alpha$.

The stator 30 is supplied with current through a reversing switch 44 comprising two blades 44′, 44″ caused to change position on each of the rotor impulses by means such as a cam 45 so as to reverse the stator polarity. The details of a control system employing such an arrangement to provide continuous stepping motion, and including features providing intermittent motor movement for recording and playback, are set forth in my copending application, Ser. No. 181,544, above referred to.

Above the tape is a pressure plate 46 borne by a pivotable bar 48 and which in the down position of the bar constrains the tape, in cooperation with guide means on the housing surface 16, to a straight longitudinal path with the drive sprockets 20 engaged with the rows of holes 22 in the tape 12. The bar 48 may be raised to facilitate initial threading of the end of a piece of tape or tape from the supply roll 14 into position over the sprocket 20. In normal use of the machine for recording dictation, however, the bar 48 will be left down unless the tape 12 becomes disengaged from the sprocket drive.

Also carried by the bar 48 is a tape severing mechanism, the details of which are set forth in the copending application of Marcel Jules Helene Staar, Ser. No. 181,545, filed Mar. 22, 1962 entitled "Tape Severing Mechanism," now U.S. Patent No. 3,221,585. In general, the tape severing mechanism includes a knife blade 50 mounted on the forward edge of the bar 48 for movement to a lowered position as shown in dotted lines in FIG. 1, in which position the blade is translatable across the tape 12 to sever a length of tape bearing dictation.

Turning now to the circuit shown in FIG. 1A, for illustrative purposes this circuit includes a backspace or "reverse" switch 52. By closing such switch 52, potential will be applied to the stator poles 32 of the stepping motor 24 through the periodically reversed stator switch 44 to cause the stepping motor to operate. It will be appreciated that the direction of operation of the motor depends on the preference means, and the latter depends on the state of the reverse solenoid 40. During recording and with the switch 52 open, the reverse solenoid 40 will be deenergized since the circuit thereto is open, and, consequently, the preference means 34 will tend to offset the rotor in the forward direction.

During recording, the tape 12 will be intermittently stepped forward to the position in FIG. 1 where the leading edge is located a substantial distance downstream of the recording head 18 and knife blade 50. If it is assumed that dictation has been recorded on the tape while it has been so intermittently advanced, the operator may desire to backspace the tape to playback a portion of the dictation. This may be achieved by closing the backspace switch 52. In the forward drive direction the stepping motor 24 operates intermittently and in synchronism with the oscillations of the recording head. In the reverse drive direction, however, it is desired that the motor 24 step continuously so as to backspace the tape rapidly to the desired position as quickly as possible for efficiency and convenience. To this end the stator polarity switch 44 is operated responsive to the rotor 27 movement by means such as the cam 45 so as to immediately reverse stator polarity after each rotor step, making the backspacing motion of the tape virtually continuous.

With such rapid reverse movement of the tape 12, however, the operator may not be able to respond quickly enough to stop the drive motor 24 before the tape 12 has been backspaced completely free of the sprocket 20. To preclude this from occurring, according to the present invention, means are included for sensing when the end of the tape has passed (while moving in the backspace or reverse direction) a point adjacent the knife blade 50 on the bar 48. Furthermore, means are included in the control circuit to respond to such sensing means to stop further backspacing movement of the tape 12.

It will be appreciated that the ideal position to stop the tape 12 is with the tape end at the location of the knife blade 50, or slightly upstream of such location, since the end of the tape is normally situated at the blade 50 when the recording head 18 records the first trace. To this end, it is preferred to mount a sensing element 56 as near as possible to the transverse cutting axis of the blade 50 and between the recording head 18 and such transverse cutting axis, which sensing element 56 is responsive to the tape 12 and operates via the control circuit to stop the tape with its end at the cutting axis or upstream thereof.

A preferred form of such sensing means is shown in FIG. 1. It includes a sensing element 56 mounted in an opening in the housing surface 16 defining the longitudinal path for the tape, and biased upwardly by resilient means hereinshown as a spring 58, into contact with the underside of the tape 12. Said sensing element 56 is connected to a pivotable member 60 carrying one contact 62' of a switch 62. The other switch contact 62'' is fixed. The switch contacts 62', 62'' are connected, as shown in FIG. 1A, to the upper blade 52' of the backspace switch and to the reverse solenoid 40, respectively.

With the control circuit shown in FIG. 1A, after the end of the tape 12 passes the sensing element 56, the latter lifts to open the switch contacts 62', 62'', deenergizing the reverse solenoid 40 and thereby causing the preference means to offset the stepping motor rotor 27 in the forward direction.

In keeping with the invention, the stepping motor may be automatically disconnected from the potential source by the sensing element 56, or the motor may be caused to begin stepping in the forward direction. Alternative forms of circuits to achieve either such result are shown. Thus, with the circuit of FIG. 1A, the stator 30 will continue to be energized and, consequently, the rotor 27 will be caused to step in the forward direction.

Figure 3:
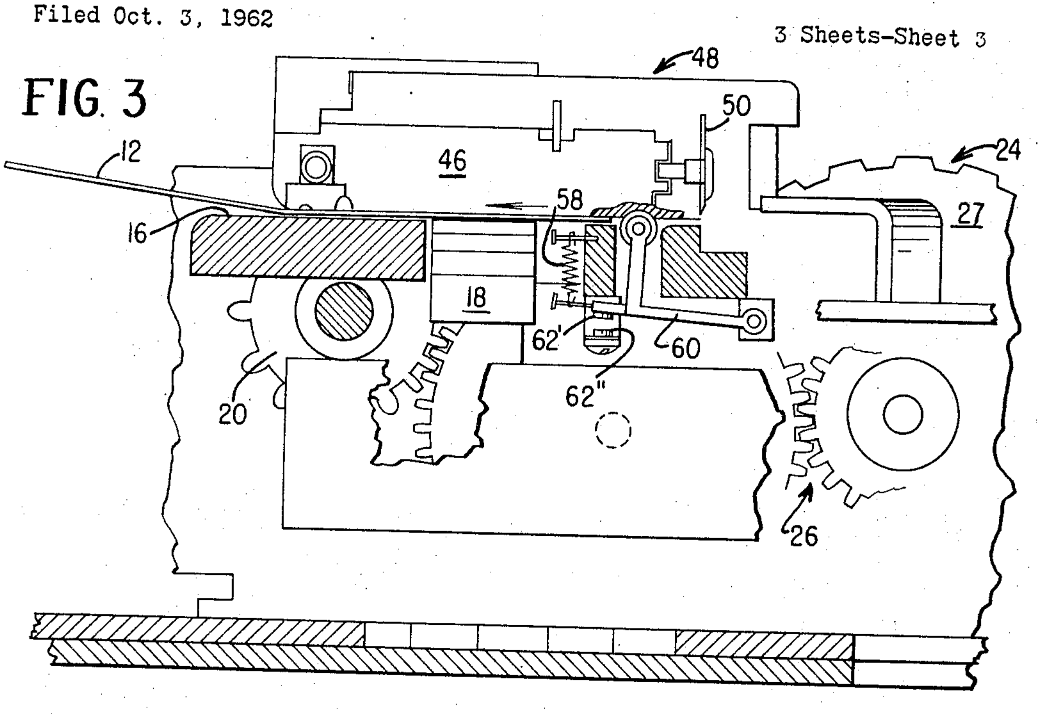
FIG. 3 is a longitudinal fragmentary sectional view through the dictating machine of FIG. 1, and illustrates the tape after backspacing to the limit position set by the control system.
Figure 4:
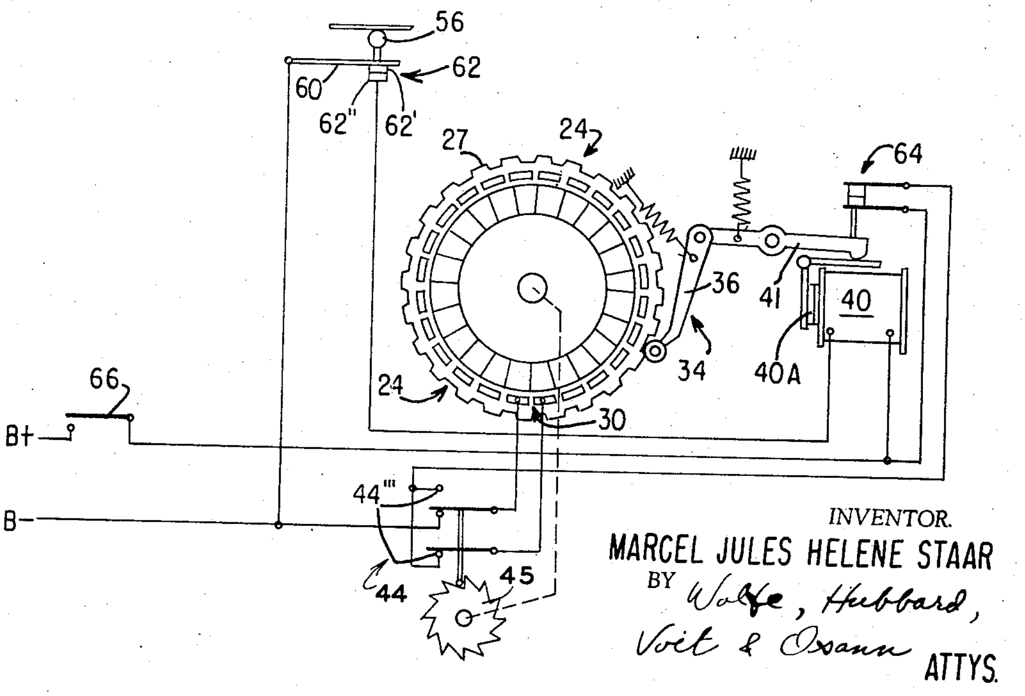
FIG. 4 is a diagrammatic illustration of an alternative embodiment of the control circuit shown in FIG. 1.

In an alternative form of control circuit, depicted in FIG. 3, the stepping motor 24 as well as the reverse solenoid 40 is under the control of the sensing means. Thus, responsive to the sensing element switch 62 being opened when the end of the tape passes the sensing element 56, means hereinshown as a stator control switch 64 operated by the reverse solenoid 40, opens the stator supply circuit. Such stator control switch 64 is closed by the preference means lever 41 when the armature 40A of the reverse solenoid 40 is drawn up, as shown in FIG. 4, upon the reverse solenoid being energized. It will be appreciated that the stator control switch 64 will be opened when the reverse solenoid is deenergized. The stator control switch 64 is connected between the source of potential shown as B+ and one set of stator switch contacts 44'''. Accordingly, when the tape passes the sensing means, the sensing element 56 lifts to open the circuit to the reverse solenoid 40, deenergizing the latter so that the preference means element 36 is acuated to a forward preference position to prepare the rotor 27 for rotation to advance the tape in a forward recording or playback direction. The stator control switch 64 is simultaneously opened to interrupt the supply of current to the stator 30 thereby to stop the stepping motor. In this form of control circuit, therefore, the stepping motor 24 will be stopped to prevent the tape 12 from being backspaced free of the sprocket 20.

When the backspace switch 66 is actuated, the reverse solenoid 40 and the stepping motor 24 are both energized to start the backspacing operation. To start the stepping motor for "playback and record," separate switch means (not shown) will be employed.

I claim as my invention:

1. In a machine for sound recording and playback on a longitudinally movable tape, said machine having a recording and playback head movable transversely of the tape, and a tape cutting mechanism for severing the tape along a transverse cutting axis immediately downstream of the transverse axis of movement of the recording and playback head and thereby providing a free end of the tape, reversible power means having a single driving connection to said tape adjacent said recording and playback head and selectively operable to advance and backspace the tape relative to said head, the tape normally being fed in the advance direction downstream along said path with its free and threaded through said driving connection, and said recording and playback head, the tape being returnable upstream by backspacing for locating a section of the tape adjacent said head, a tape sensing element mounted in the path of said tape between said transverse cutting axis and the transverse axis of movement of said recording and playback head and engageable by the tape for sensing its presence and thereby indicating that the tape is threaded through said driving connection, and control means including said sensing element connected to interrupt the backspacing operation of said reversible power means responsive to the free end of the tape being backspaced past said sensing element and the tape being disengaged from said element, thereby to stop the tape before the free end reaches said driving connection.

2. In a machine for sound recording and playback on a longitudinally movable tape, said machine having a recording and playback head movable transversely of the tape, the combination comprising, reversible power means having a driving connection to said tape adjacent said recording and playback head, said power means including a reversible stepping motor operable to advance and backspace the tape relative to said head, means mounted in the path of said tape downstream of said driving connection for sensing tape position, control means including an electrical circuit connecting said stepping motor to a source of power, a reverse solenoid included in said circuit and operably connected upon being energized to reverse the direction of rotation of said stepping motor to backspace the tape, a switch included in said circuit for interrupting the supply of power to said reverse solenoid, and means connecting said sensing means to open said switch responsive to the end of the tape being backspaced past said sensing element, thereby to stop the backspacing of the tape before the end of the tape reaches said driving connection while continuing the operation of the stepping motor to move the tape in the advance direction.

3. In a machine for sound recording and playback on a longitudinally movable tape, said machine having a recording and playback head movable transversely of the tape, the combination comprising, reversible power means having a driving connection to said tape adjacent said recording and playback head, said power means including a reversible stepping motor operable to advance and backspace the tape relative to said head, means mounted in the path of said tape downstream of said driving connection for sensing tape position, control means including an electrical circuit connecting said stepping motor to a source of power, a reverse solenoid included in said circuit and operably connected upon being energized to reverse the direction of rotation of said stepping motor to backspace the tape, a switch operated by said reverse solenoid and included in said circuit for interrupting the supply of power to said stepping motor, a switch operated by said sensing means and included in said circuit for interrupting the supply of power to said reverse solenoid, and means connecting said sensing means to open said last mentioned switch responsive to the end of the tape being backspaced past said sensing element, thereby to stop the stepping motor and to deenergize said reverse solenoid before the end of the tape reaches said driving connection.

References Cited

UNITED STATES PATENTS

| | | | |
|---|---|---|---|
| 2,563,545 | 8/1951 | Moreland et al. | 179—100.2 |
| 2,885,485 | 5/1959 | Eigen | 179—100.2 |
| 2,886,648 | 5/1959 | Ives | 179—100.1 |
| 2,933,319 | 4/1960 | Proctor | 179—100.2 |
| 2,989,590 | 6/1961 | De Boo | 226—11 X |
| 3,152,227 | 10/1964 | Durio | 179—100.2 |
| 3,218,397 | 11/1965 | Pastor | 179—100.2 |

BERNARD KONICK, *Primary Examiner.*

V. P. CANNEY, *Assistant Examiner.*